United States Patent [19]

Inoue et al.

[11] 4,445,715

[45] May 1, 1984

[54] INSULATED JOINT AND METHOD FOR PRODUCING SAME

[75] Inventors: Takeo Inoue; Takashi Shirazawa, both of Hyogo, Japan

[73] Assignee: Mitsubishi Denki Kabushiki Kaisha, Tokyo, Japan

[21] Appl. No.: 250,778

[22] Filed: Apr. 3, 1981

[30] Foreign Application Priority Data

Apr. 14, 1980 [JP] Japan .................................. 55-51151

[51] Int. Cl.³ ............................................ F16L 11/12
[52] U.S. Cl. ...................................... 285/54; 285/284; 285/DIG. 12; 428/432; 501/32; 501/75
[58] Field of Search ................... 285/53, 54, DIG. 12, 285/374, 284, 291, 345, DIG. 16; 428/432, 433, 434; 65/43; 501/32, 75

[56] References Cited

U.S. PATENT DOCUMENTS

| | | | |
|---|---|---|---|
| Re. 15727 | 12/1923 | Broadbent | 501/32 |
| 2,136,877 | 11/1938 | Clamart | 501/32 X |
| 2,322,587 | 6/1943 | Payne | 285/DIG. 16 X |
| 2,558,878 | 7/1951 | Richardson | 501/32 X |
| 3,353,563 | 11/1967 | Hutton | 285/5 A X |
| 3,515,346 | 6/1970 | MacVaugh | 285/231 X |
| 3,906,147 | 9/1975 | Pirooz | 285/DIG. 12 |
| 4,171,832 | 10/1979 | Metcalfe | 285/DIG. 12 |

FOREIGN PATENT DOCUMENTS 386483 1/1933 United Kingdom ............... 285/345

Primary Examiner—Dave W. Arola
Attorney, Agent, or Firm—Sughrue, Mion, Zinn, Macpeak and Seas

[57] ABSTRACT

An insulated joint and a method for producing the joint in which first and second tubular members are joined together with an insulating member disposed in the gap therebetween. The first tubular member includes a cylindrical body with an outer circumferential portion having a larger internal diameter than the external diameter of the cylindrical body while the second tubular member has the same internal and external diameters as those of the cylindrical body of the first tubular member. At least a portion of the second tubular member is fitted in the outer circumferential portion of the first tubular member with a gap therebetween. An insulating member is disposed in the gap to hermetically couple the first and second tubular members while insulating them from each other.

2 Claims, 5 Drawing Figures

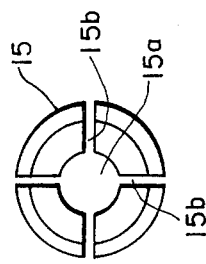
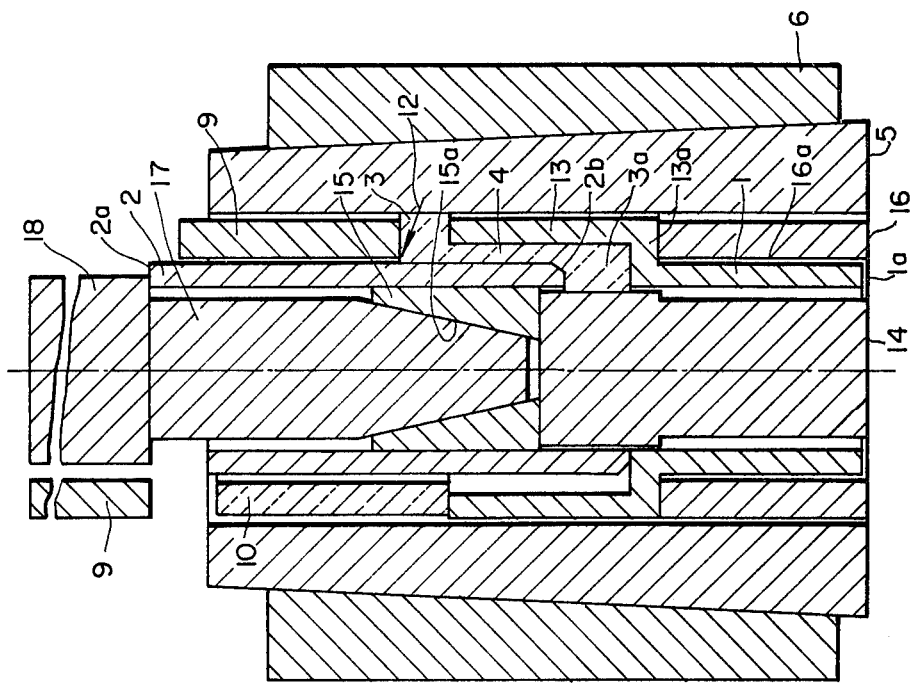
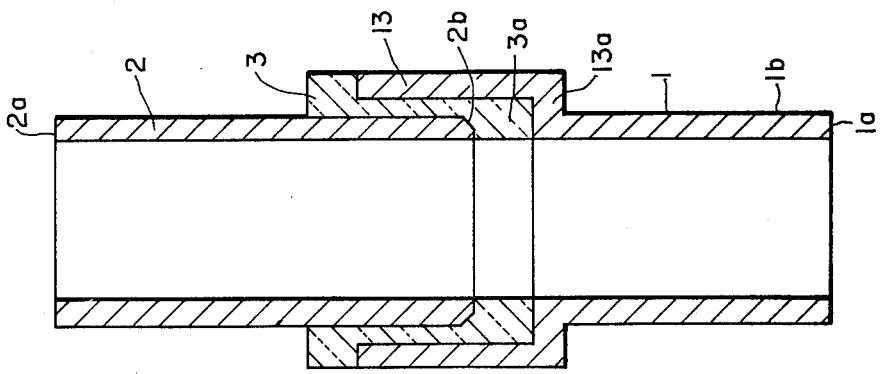

INSULATED JOINT AND METHOD FOR PRODUCING SAME

BACKGROUND OF THE INVENTION

The present invention relates to both an insulated joint which is formed with a throughhole at its center and which is adapted to be either attached through the wall of a hermetical container of metal, for example, or disposed midway of a metal pipe, and to a method for producing the joint. More particularly, the invention relates to an insulated joint which is suitable for use in a cooling system using a cold liquid such as liquid nitrogen or helium in which a cold liquid passes through the joint with very little heating of the liquid.

Major characteristics required for an insulating joint to be used for the aforementioned purposes are as follows. First, the hermetical sealing characteristics should be quite excellent. The ability to withstand large temperature changes and impact forces should be sufficient that the hermetical sealing characteristics are not adversely affected even by many repetitions of abrupt rises and drops of the temperature. The mechanical impact strength must be sufficient. Moreover, the changes in characteristics with age should be sufficiently little that the reliability of the joint is maintained for a long time. In addition to the aforementioned fundamental requirements, the attachment to the wall of a system and the connection to a metal pipe should be easy. Furthermore, the external size of the joint should be very small for a predetermined flow rate and the price should be low.

Generally, an insulating joint of the aforementioned type utilizes an insulating member sandwiched between two conduits. In such a joint, the most important factor affecting the characteristics enumerated above is this insulating member. The use of an organic material for the insulating member is considered impossible as a practical matter because hermetic sealing characteristics are lowered as the material ages due to repeated temperature changes. In case glass is used for the material, on the other hand, cracking may take place due to abrupt changes in the temperature and the mechanical impact strength of glass is low. If a porcelain material is used and fused by means of metal having a low melting point, the thermal and mechanical impact strengths are low as in the case of glass. Therefore, none of these materials can be used as a practical matter.

Considering the various characteristics thus far described, a most excellent material for the insulating member is a molded glass-mica composition as will be described in detail in the following.

Molded glass-mica as an insulating member can be prepared by heating a mixture of glass powders and mica powders to a temperature sufficiently high to melt the glass so that it will flow under pressure. The melted mixture is pressure molded.

A conventional example of an insulated joint using molded glass-mica as the insulating member will be described with reference to FIG. 1. FIG. 1 is a longitudinal section showing the construction of the joint. In FIG. 1, reference numeral 1 indicates a first tubular member, and reference numeral 2 indicates a second tubular member which is made of a metal such as steel or stainless steel which can withstand a temperature of about 600° C. Reference numerals 1a and 2a indicate joint portions which are to be joined to system walls, conduits or the like by such as by welding or with screws. Reference numeral 3 indicates an insulating member which is made of molded glass-mica and which is disposed to fill a gap 4 thereby to fix the first tubular member 1 and the second tubular member 2 while forming a tight hermetic seal therebetween. The insulating joint thus constructed provides the required characteristics such as the hermetic seal, the ability to withstand temperature changes and mechanical impact forces and long term reliability. However, this joint construction suffers the drawbacks that attachment to a system wall or connection to a metal pipe is quite difficult, that the manufacturing cost thereof is high, and that a high resistance is presented to the passage of a liquid medium through the joint.

In order to further understand the reasons for those defects, a general explanation of the conventional producing method will be given with reference to FIG. 2. FIG. 2 is a longitudinal section showing the molding condition of an insulating joint according to the prior art of which the lefthand half of the figure shows the condition of the joint immediately before a pressure molding process and the righthand half of the figure shows the condition of the joint after the completion of the pressure-molding process. In FIG. 2, reference numerals 1, 2, 3 and 4 indicates the same parts as those of FIG. 1. Reference numeral 5 indicates a splitting wall of two piece construction, for example, reference numeral 6 indicates a mold flask, and reference numeral 7 indicates a supporting member which is composed of a holding portion 7a for holding the second tubular member 2 on the top surface at the center of the holding portion and a cavity 7b in which is later formed an internal insulating portion 3a. Reference numeral 8 indicates an auxiliary member the outer surface of which extends directly from the outer surface of the second tubular member 2 and which is formed with an extending portion 8a for maintaining the two outer surfaces in this relationship. Reference numeral 9 indicates a pressure member which is formed with a throughhole 9a through which the auxiliary member 8 and the second tubular member 2 can pass.

The mold constructed of the aforementioned five parts is used. Reference numeral 10 indicates a preliminary molded member which is prepared by adding water to a mixture of the same glass and mica powders used for the insulating member 3. The wetted mixed powders are molded with a second mold (not shown) into a cylindrical form having a throughhole 10a at its center. The cylindrically shaped powders are next dried.

In the molding process, as shown in the lefthand part of FIG. 2, the split wall 5, the mold flask 6 and the supporting member 7 are assembled. They are then heated to a predetermined temperature together with the auxiliary member 8 and the pressure member 9, neither of which are assembled at this point. Then, the first tubular member 1, the second tubular member 2 and the preliminary molded member 10 are heated to predetermined temperatures. After heating, the first tubular member 1 is first fitted in the gap between the splitting wall 5 and the supporting member 7. Then, the second tubular member 2 is placed on the supporting member 7. The auxiliary member 8 is next placed upon the second tubular member 2. Finally, the preliminary molded member 10 is placed on the first tubular member 1. The pressure member 9 is then placed upon the preliminary molded member 10 and a pressure is applied to the pressure member 9 by a pressure-molding machine. As a result, the material of the preliminary molded member 10 flows to fill up the gap 4 thereby to form the internal insulating portion 3a and an outer insulating portion 3b. The condition at this time is shown in the righthand side of FIG. 2. Due to the flow of the preliminary molded member 10, a lifting pressure is established on the bottom surface of the second tubular member 2 in a region indicated by an arrow 11 which urges the second tubular member 2 upwards. In order to prevent actual movement of the second tubular member 2 of a pressure higher than the lifting pressure should be applied to the auxiliary member 8 thereby to prevent lifting. After the pressure molding has been finished, the mold is cooled to a desired temperature and the mold is disassembled to allow the resulting molding to be removed.

Since the diameter of the center throughhole 2b of the second tubular member is small, the second tubular member is machined to the configuration of the product shown in FIG. 1.

The conventional product thus made by the aforementioned process can sufficiently attain the required characteristics such as the hermetic sealing characteristic and the resistance to temperature change and mechanical impact. However, since the first and second tubular members have different external and internal diameters, attachment of the joint to the system wall, especially if the product is used between metal pipes thereby to provide an insulating function, is quite difficult. On the other hand, even if any device is made such that connection can be made more easily, the resulting difference in the internal diameters necessitated by such a modification leads to an increase in the flow resistance. If this problem is to be avoided, an especially large insulated joint has to be used so that the system is enlarged as a whole and the price of the product then is excessively high.

Difficulties related to the production of the product will be described. An intense external pressure is applied to the area indicated by the arrow 12 in the righthand portion of FIG. 2 during the pressure molding process. As a result, deformation takes place making the molding process impossible if the thickness of the second tubular member 2 is too small. Therefore, a thick second tubular member 2 has to be used making it necessary that the diameter of the throughhole 2b be enlarged by a machining process after the molding process. As a result, the length of the second tubular member 2 must be restricted.

SUMMARY OF THE INVENTION

Accordingly, the invention provides an insulated joint including a first tubular member provided at one end of a cylindrical body with an outer circumferential portion having a larger internal diameter than the external diameter of the cylindrical body, a second tubular member having the same internal and external diameters as those of the cylindrical body of the first tubular member with at least a portion of the second tubular member being fitted in the outer circumferential portion of the first tubular member with the gap therebetween, and an insulating member disposed in the gap hermetically coupling the first and second tubular members while insulating them from each other. The insulating member is preferably formed as a glass-mica molded body formed from glass and mica powders. The second tubular member preferably has a leading end disposed within the outer circumferential portion of the first tubular member and has a chamfered portion around the circumference thereof.

Yet further, the invention may be practiced by a method of producing an insulated joint including the steps of providing a first tubular member having at one end thereof a cylindrical body with an outer circumferential portion having a larger internal diameter than the external diameter of the cylindrical body, providing a second tubular member having the same internal and external diameters as those of the cylindrical body of the first tubular member, providing an external mold flask adapted for pressure molding an insulating member in a gap between the first and second tubular members, providing an internal molding flask for molding the insulating member with the internal flask being adapted to ride on the first and second tubular members, providing pressure applying means for applying a pressure to an inner circumferential edge of the second tubular member when the insulating member is pressure molded, heating the first tubular member and the internal and external mold flasks, arranging the first tubular member between the internal and external mold flasks, inserting one end portion of the second tubular member into the outer circumferential portion of the second tubular member, arranging the second tubular member such that the internal mold flask is fitted in the second tubular member, and pressure molding the insulating member between the first and second tubular members while applying pressure to the internal circumferential edge of the second tubular member with the use of the pressure applying means.

BRIEF DESCRIPTION OF THE DRAWINGS

FIG. 3 is a longitudinal section showing the construction of an insulated joint according to the present invention;

FIG. 4 is a longitudinal section illustrating a preferred method of producing an insulated joint according to the present invention in which the lefthand portion shows conditions immediately before a pressure molding process and the righthand portion shows conditions after the pressure molding process; and FIG. 5 is a top plan view showing the construction of a side pressure member used in the process illustrated in FIG. 4.

DESCRIPTION OF THE PREFERRED EMBODIMENTS

Figure 1:
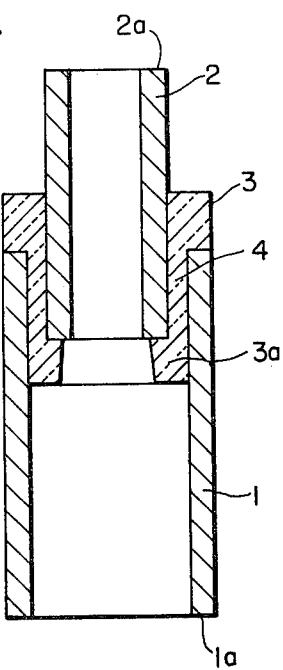
FIG. 1 is a longitudinal section showing the construction of an insulated joint according to the prior art.

The present applicants have succeeded in providing a satisfactory insulated joint which is completely free from defects such as an increased flow resistance, difficulties in the connecting the joint and an increased system size and as well as problems in production due to the difference in the shapes and sizes of the first and second tubular members while completely retaining the excellent characteristics of the aforementioned conventional joint.

The construction and a method of producing a preferred embodiment of an insulated joint according to the present invention will be described hereinafter.

A preferred embodiment of an insulated joint constructed according to the present invention is shown in FIG. 3. As shown, reference numeral 1 indicates a first tubular member in which a cylindrical body 1b is formed with a shoulder portion 13a with an outer circumferential portion 13. Reference numeral 2 indicates a second tubular member which has the same internal and external diameters as the cylindrical body 1b of the first tubular member 1 and which has its lower portion formed with a chamfered portion 2b. Reference numeral 3 indicates an insulating member which is made of glass-mica material.

A preferred method for producing the joint of FIG. 3 according to the present invention will be described hereinafter with reference to FIG. 4.

Figure 2:
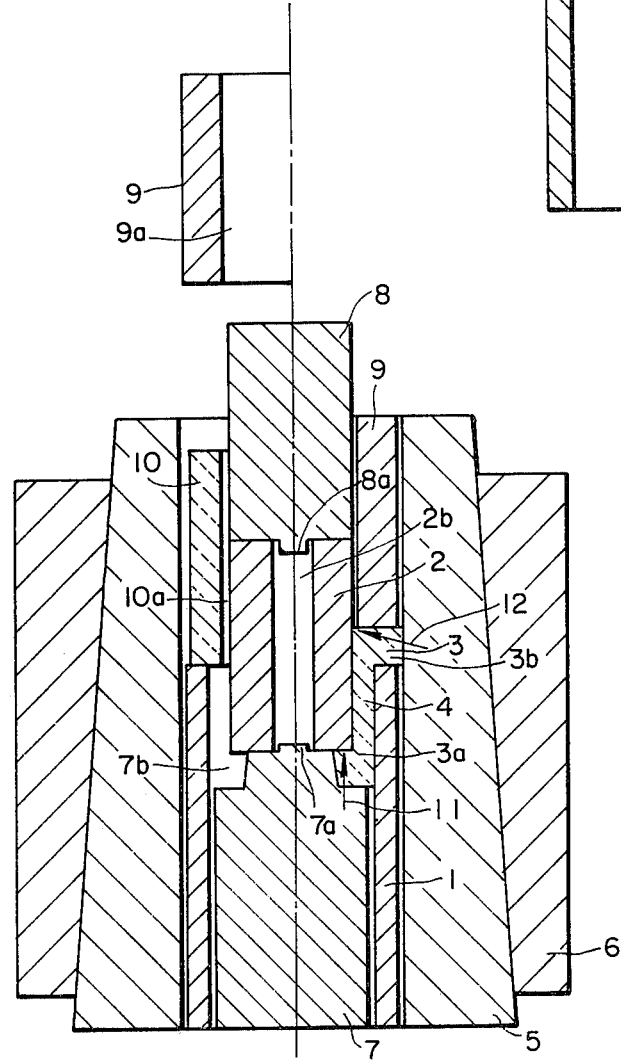
FIG. 2 is a longitudinal section used for illustrating a method of producing the insulated joint of FIG. 1 in which the lefthand portion shows conditions immediately before a pressure molding process and the righthand portion shows conditions after the pressure molding process.

In FIG. 4, the lefthand half shows conditions immediately before the pressure molding process and the righthand half of FIG. 4 shows conditions after the pressure molding process. FIG. 5 is a top plan view showing a side pressure member 15. The splitting wall 5 the molding flask 6 and the pressure member 9 have the same constructions as those used in the conventional process described with reference to FIG. 2.

Reference numeral 14 indicates a holding member which has an external diameter corresponding to the internal diameter of both the cylindrical body 1b of the first tubular member 1 and the second tubular member 2 and which acts as an inner mold for the insulating member. Reference numeral 15 indicates a side pressure member which has the same external diameter as the internal diameter of the second tubular member 2 and which has such a quadrant-split construction with both a conical throughhole 15a at its center and four gaps 15b. Reference numeral 16 indicates a supporting member which is formed with a throughhole 16a at its center. The supporting member 16 encloses a portion of the first tubular member 1 and supports the outer circumferential portion 13 of the first tubular member 1 at a shoulder portion 13a. The mold flask 6, the splitting wall 5 and the supporting member 16 together form an outer mold.

Reference numeral 17 indicates a pressure member the lower portion of which is formed in a conical shape adapted to be snugly received in the throughhole 15a in the side pressure member 15. The pressure member 17 has a total length such that its upper end is even with the end face of the second tubular member 2 after the molding process has been finished. Reference numeral 18 indicates a holding member which has a larger external diameter than the internal diameter of the second tubular member 2. The side pressure member 15, the pressure member 17 and the holding member 18 together are used to apply a pressure on the inner circumferential portion of the upper end of the second tubular member 2.

The first tubular member 1 and the second tubular member 2 are prepared as follows. The material for these tubular members is not particularly limited and may be any material having substantially the same strength at high temperatures as steel. Moreover, the mold itself may be made of a similar material. The preliminary molded member 10 is prepared by pressure-molding a mixture of glass and mica powders at room temperature into a predetermined shape by the use of a second mold (not shown).

An actual example of a method for producing the insulated joint in accordance with the invention will be described in detail. First, the preliminary molded member 10 was prepared using 55 wt% of glass powders which were prepared by pulverizing from a glass block to a 200 mesh size. A composition of the glass was 1 molar part PbO, 0.4 molar parts $B_2O_3$, 0.4 molar parts $SiO_2$ and 0.2 molar parts $AlF_3$. This pulverized mixture was mixed with 45 wt% of powders of mica of synthetic gold fluoride of a size of 60 to 200 mesh. 5 wt% of water was added to the mixture. 65 gm of the resultant material was weighed and molded by a cold pressure molding process into a cylinder which had an internal diameter of 35 mm$\phi$, an external diameter of 45 mm$\phi$ and a height of 35 mm using another mold (not shown). This molding was put in a drier at 120° C. for two hours to dry it, thus finishing the preparation of the preliminary molded member 10.

Next, the first tubular member 1 was prepared by welding a stainless pipe, which had an internal diameter of 40 mm$\phi$, an external diameter of 48 mm$\phi$ and a length of 30 mm, to a stainless pipe, which had an internal diameter of 26 mm$\phi$, an external diameter of 34 mm$\phi$ and a length of 35 mm, through a disc of stainless steel which had a thickness of 5 mm and an external diameter of 48 mm$\phi$ and which had a center hole of diameter 26 mm$\phi$. The second tubular member 2 was a pipe of stainless steel which had an internal diameter of 26 mm$\phi$, an external diameter of 34 mm$\phi$ and a length of 70 mm and which had one end formed with a chamfered portion 2b on its outer circumference.

In the mold, the holding member 14 and the supporting member 16 were enclosed in the split wall 5 which was assembled by the mold flask 6. The side pressure member, the pressure member, the holding member 18 and the pressure member 9 were not assembled but were heated to 300° C. Both the first tubular member 1 and the second tubular member 2 were heated to 550° C. and the preliminary molding 10 was heated to 600° C. After the respective heating processes had been completed, the first tubular member 1 was first inserted into the gap between the holding member 14 and the supporting member 16 and was placed on the supporting member 16 such that it was supported by the shoulder portion 13a. At that time, the leading end 1a was located in the gap.

Next, the second tubular member 2 was placed on the shoulder portion 13a of the first tubular member 1 with its chamfered portion 2b directed downward. Then, the side pressure member 15 was placed on the holding member 14 and the pressure member 17 was inserted into the conical hole in the side pressure member 15. The preliminary molded member 10 was next placed on the outer circumferential portion 13 of the first tubular member 1. Following this, the holding member 18 was placed upon the pressure member 17. A total pressure of 5 tons was applied to the holding member 18 using a pressure molding machine. The condition at that time is shown in the lefthand side of FIG. 4.

Next, the pressure member 9 was placed upon the preliminary molded member 10 and a total pressure of 12 tons was applied to the pressure member 9 using the pressure molding machine. The condition following this is shown in the righthand side of FIG. 4. The method of the preliminary molded member 10 under pressure flowed downward through the gap 4 between the second tubular member 2 and the outer circumferential portion 13. The pressure applied to the chamfered portion 2b at that time acted as a lifting pressure to lift the second tubular member 2. When the upper end face 2a contacted the holding member 18, the upward movement of the second tubular member was interrupted. As a result, the material of the preliminary molded member 10 completely filled the gap as shown in the righthand side of FIG. 4. The molding was cooled until the temperature of the insulating member 3 reached 300° C. After the cooling process, the mold was disassembled to allow the resultant product to be taken out and thus completing the molding process.

In the aforementioned example of the method of the invention, specific features thereof will be described in more detail. The reason why pressure was applied to the pressure member 17 before pressure was applied to the preliminary molded member 10 is to establish a radial pressure on the side pressure member 15 so that an internal pressure is applied to the second tubular member 2 thereby to prevent the second tubular member 2 from being deformed by the pressure which is established in the direction of the arrow 12 when pressure is applied to the preliminary molded member 10. In the conventional method, on the contrary, a thick tubular member was used to prevent such deformation which was later machined to form the final product.

Next, the reason why the second tubular member 2 has its lower end formed with the chamfered portion 2b is to lift the second tubular member 2 when pressure is applied to the preliminary molded member 10. Without this lift, it would be quite difficult to construct the inner insulating portion 3a which is located between the first and second tubular members 1 and 2. Since without the aforementioned chamfered portion 2b, it would be necessary to hold the second tubular member 2 not in contact with but spaced from the first tubular member 1 before the pressure molding process, the method of the invention is considered very effective.

The reason why the external diameter of the holding member 18 is larger than the internal diameter of the second tubular member 2 is to provide a stop to the lifting of the second tubular member 2 to achieve its proper positioning. According to this method, the clearance for the inner insulating portion is always maintained uniform. In the preferred embodiment, since the pressure member 9 slides on the outer side of the holding member 18, it is necessary to make the holding member 18 smaller than the internal diameter of the pressure member 9.

In the preferred embodiment, lead glass has been described as being used as the glass with which the preliminary molded member 10 is constructed. However, the invention is not limited thereto. A glaze for an enamelled iron device containing no lead, which glaze is commercially available, may be used. On the other hand, since the mica powders are heated to a temperature of about 600° C. or higher in the presence of the glass, mica powders decomposed at that temperature cannot be used. That is to say, natural mica cannot be used and instead synthetic mica must be used of which mica of synthetic phlogopite is the most suitable.

Next, the heating temperature relationships among the mold, the tubular members and the preliminary molding will be described. The temperature of the mold is closely dependent upon the transition temperature of the glass material. More specifically, in case the former temperature is excessively higher than the transition temperature, the insulating member may stick to the mold during the pressure molding process thereby making it difficult to open and separate the mold. If the mold temperature is excessively low, a portion having a low density may be formed. It is therefore desired that the temperature of the mold be held slightly lower than the transition temperature. Moreover, since it is an essential condition that the temperature for pressure release and disassembly be lower than the transition temperature, it is important that the mold temperature take that point into consideration. The temperature of the first and second tubular members is closely dependent on the heating temperature of the preliminary molded member, as will be described below. If the transition temperature of the glass is exceeded, no portion of low density will be formed. If, on the contrary, the temperature of the tubular members is excessively lower than that of the preliminary molded member, the viscosity of the molding will be too high so that the fluidity of the material of the preliminary molded member will be so low that uniform filling becomes difficult. For an excessively high temperature, the mechanical strength of the metal members of the mold may be adversely affected leading to undesirable deformation thereof. It is desired that the temperature of the tubular members be slightly lower than the heating temperature of the preliminary molded member. The temperature of the preliminary molded member is directly related to the softening temperature of the glass material used. If glaze of an enamel for steel coatings is used, the enamelling temperature must be taken into account so that the temperature of the preliminary molded member may be as high as 800° to 850° C.

The mixture ratio of the mica powders and the glass powders, which is related to the molding conditions, is an important factor. If the mixing ratio of the glass material is increased, the improved fluidity thereby resulting during pressure molding facilitates the molding process but may result in a lowering of the mechanical strength that the cracking of the insulating member takes place or the production of a uniform insulating member becomes difficult. In fact, the most preferable mixing ratio of the glass material falls within a range of 30 to 50% in a volumetric ratio.

In the description above of the present invention, the mold is described as using a splitting wall and a mold flask. In the case of the practical mass-production, the molded parts can be fixed by the use of a pressure molding machine which is equipped with a fixing member at a center portion and with drive units at upper and lower portions and can be heated by the use of a heater attached to that machine so that a continuous molding process can be performed. Thus, it is possible to produce products of similar characteristics at a lower cost.

The insulated joint according to the present invention is completely free from the most prominent defects of conventional joints, specifically, the difficulty in making connections due to the difference in internal and external diameters of the first and second tubular members, the increased flow resistance due to the difference in the internal diameters of the tubular members, the waste due to the use of an unnecessarily large joint in order to avoid an increased flow resistance and the resulting high prices. Moreover, the invention retains completely the required desirable characteristics such as the hermetic sealing characteristics, the ability to withstand temperature changes and mechanical impact forces and resistance to changes due to aging. Moreover, by the use of the side pressure member, a molding process using thin tubular members is made possible while making it unnecessary to use a first machining process which has been indispensable for the conventional method.

As has been described hereinbefore, according to the present invention, it is possible to use tubular members which have the same size and a small thickness while yet retaining all the beneficial characteristics discussed above.

Although the above description of the present invention relates to an insulated joint through which a liquid flows under an insulated condition, the application of the insulated joint is not limited to liquid mediums and it can be used, for example, with a gas under a high pressure and a liquid or a gas at a high temperature.

What is claimed is:

1. An insulated joint comprising: a first tubular member provided at one end of a cylindrical body with an outer circumferential portion having a larger internal diameter than the external diameter of said cylindrical body; a second tubular member having the same internal and external diameters as those of said cylindrical body of said first tubular member and fitted in said outer circumferential portion of said first tubular member with a gap therebetween; and an insulating member disposed in said gap hermetically coupling said first and second tubular members while insulating said first and second tubular members from each other wherein said insulating member comprises a glass-mica body molded in situ by the application of heat and pressure and formed from glass and mica powders with the glass powders constituting 30–50 percent of the powders by volume and wherein said glass powders are comprised of 1.0 molar part PbO, 0.4 molar parts $B_2O_3$, 0.4 molar parts $SiO_2$, and 0.2 molar parts $AlF_3$.

2. The insulated joint as set forth in claim 1 wherein said second tubular member has a leading end disposed within said outer circumferential portion of said first tubular member formed with a chamfered portion around the circumference thereof.

* * * * *